(12) United States Patent
Yasutomi

(10) Patent No.: US 11,238,609 B2
(45) Date of Patent: Feb. 1, 2022

(54) POINT CLOUD DATA PROCESSING METHOD AND POINT CLOUD DATA PROCESSING DEVICE

(71) Applicant: TOPCON CORPORATION, Tokyo (JP)

(72) Inventor: Satoshi Yasutomi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 206 days.

(21) Appl. No.: 16/826,776

(22) Filed: Mar. 23, 2020

(65) Prior Publication Data

US 2020/0311963 A1 Oct. 1, 2020

(30) Foreign Application Priority Data

Mar. 28, 2019 (JP) .............................. JP2019-064792

(51) Int. Cl.
*G06T 7/70* (2017.01)
*G01S 19/39* (2010.01)
*H04N 5/247* (2006.01)

(52) U.S. Cl.
CPC .............. *G06T 7/70* (2017.01); *G01S 19/393* (2019.08); *H04N 5/247* (2013.01); *G06T 2207/10028* (2013.01)

(58) Field of Classification Search
CPC ..................... G01S 19/393; G06T 7/70; G06T 2207/10028; H04N 5/247

USPC .......................................................... 382/103
See application file for complete search history.

(56) References Cited

U.S. PATENT DOCUMENTS

| | | | | |
|---|---|---|---|---|
| 2009/0232388 | A1* | 9/2009 | Minear | G06T 3/0075 382/154 |
| 2019/0078880 | A1* | 3/2019 | Nagori | G01C 3/08 |
| 2019/0124264 | A1* | 4/2019 | Kogure | H04N 5/23296 |
| 2019/0285410 | A1 | 9/2019 | Yoshizawa et al. | |

FOREIGN PATENT DOCUMENTS

WO 2018-159690 A1 9/2018

* cited by examiner

*Primary Examiner* — Wednel Cadeau
(74) *Attorney, Agent, or Firm* — Roberts Calderon Safran & Cole P.C.

(57) ABSTRACT

A trajectory of a measuring device is calculated based on measurement data acquired by the measuring device that is moving along a measurement route, and on a vertical plane orthogonal to the trajectory, a two-dimensional figure is identified by designating an extraction angle range around an intersection of the trajectory and the vertical plane based on a perpendicular drawn down to a horizontal plane from the intersection and an extraction distance range based on the intersection on the vertical plane, and a region obtained by extending the two-dimensional figure along the trajectory is set as an extraction region, and point cloud data in a region including a specific analysis target is extracted as extracted point cloud data from entire circumference point cloud data acquired by scanning the circumference of the measuring device and included in the measurement data.

7 Claims, 14 Drawing Sheets

POINT CLOUD DATA PROCESSING METHOD AND POINT CLOUD DATA PROCESSING DEVICE

CROSS-REFERENCE TO RELATED APPLICATION

The present application claims priority under 35 U.S.C. § 119 to the Japanese Patent Application No. 2019-064792 filed Mar. 28, 2019. The contents of this application are incorporated herein by reference in their entirely.

TECHNICAL FIELD

The present disclosure relates to a point cloud data processing method and a point cloud data processing device.

BACKGROUND

Conventionally, an MMS (Mobile Mapping System) has been known for acquiring three-dimensional positional information of the peripheries of a road, such as building and road shapes, signs, and guardrails, etc., highly accurately and efficiently while moving. The MMS is configured by installing a measuring device including a GNSS (Global Navigation Satellite System), an antenna, an IMU (Inertial Measuring Unit), a camera, a laser scanner, etc., in a mobile body such as a vehicle.

An MMS is a system intended to execute post-processing of data. Therefore, first, while traveling in a measurement section on a target road by vehicle, the MMS acquires data on its own position based on a GNSS navigation signal (hereinafter, referred to as "satellite positioning data"), three-dimensional acceleration and angular velocity data obtained by the IMU (hereinafter, referred to as "inertial positioning data"), and measurement data at each point of scanning light by the laser scanner (hereinafter, referred to as "measurement point cloud data"), and next, calculates a trajectory of the vehicle on the basis of the satellite positioning data and the inertial positioning data, and synthesizes the calculated trajectory of the vehicle and the point cloud data to generate three-dimensional point cloud data as a result.

The laser scanner acquires a point cloud over the entire circumference, so that acquired point cloud data includes a large number of point data due to structural objects other than an analysis target. Therefore, in order to analyze an analysis target, a portion including the analysis target needs to be manually extracted, and the extraction operation is troublesome.

In order to solve this problem, International Publication WO 2018/159690 discloses a point cloud data processing method in which a columnar region and a parallelepiped region disposed at predetermined positions on a lower side of the trajectory are set as extraction regions, and point data belonging to these extraction regions are extracted as target point cloud data.

However, to perform an analysis of various structural objects, a new point cloud data processing method for extracting target point cloud data from entire circumference point cloud data has been required.

SUMMARY OF INVENTION

Technical Problem

The present invention was made in view of the above-described circumstances, and an object thereof is to provide a point cloud data processing method and a point cloud data processing device capable of easily extracting an analysis target from entire circumference point cloud data acquired by a measuring device that is moving along a measurement route.

Solution to Problem

In order to achieve the above-described object, a point cloud data processing method according to an aspect of the present invention includes the steps of: (a) calculating a trajectory of a measuring device based on measurement data acquired by the measuring device that is moving along a measurement route; (b) identifying, on a vertical plane orthogonal to the trajectory, a two-dimensional figure by designating an extraction angle range around an intersection P of the trajectory and the vertical plane based on a perpendicular drawn down to a horizontal plane from the intersection, and an extraction distance range based on the intersection on the vertical plane, and setting a region obtained by extending the two-dimensional figure along the trajectory, as an extraction region; and (c) extracting point cloud data in a region including a specific analysis target as extracted point cloud data from entire circumference point cloud data acquired by scanning the circumference of the measuring device and included in the measurement data.

In the aspect described above, it is also preferable that the two-dimensional figure is a trapezoid having a height in the extraction distance range.

In the aspect described above, it is also preferable that the two-dimensional figure is an annular arc shape with a predetermined width in a radial direction.

In the aspect described above, it is also preferable that, in the step (b), a shortest distance between a point whose shortest distance from the trajectory is the longest and the trajectory is designated as an extraction reference distance.

In the aspect described above, it is also preferable that in the step (b), a plane rectangular coordinate system is sectioned so that cubes each having a predetermined size are continuous, cubes each including point data whose density is not less than a predetermined value are extracted, and among the cubes including points at densities not less than the predetermined value, a cube whose shortest distance from the trajectory is the longest is identified, and a center of the cube is identified as a point that is furthest from or nearest the trajectory T.

In the aspect described above, it is also preferable that the point cloud data processing method includes the steps of:
(d) selecting one extraction mode from a plurality of extraction modes set in advance; and
(e) setting parameters corresponding to the selected one extraction mode, wherein
the steps (a) to (c) are executed by using the set parameters.

A point cloud data processing device according to another aspect of the present invention includes: a trajectory calculating unit configured to calculate a trajectory of a measuring device based on measurement data acquired by the measuring device that is moving along a measurement route; an extraction region setting unit configured to identify, on a vertical plane orthogonal to the trajectory, a two-dimensional figure by designating an extraction angle range around an intersection P of the trajectory and the vertical plane based on a perpendicular drawn down to a horizontal plane from the intersection, and an extraction distance range based on the intersection on the vertical plane, and set a region obtained by extending the two-dimensional figure along the trajectory, as an extraction region; and an extracted point cloud data generating unit configured to extract point cloud data in a region including a specific analysis target as extracted point cloud data from entire circumference point cloud data acquired by scanning the circumference of the measuring device and included in the measurement data.

Benefit of Invention

With the point cloud data processing method and the point cloud data processing device according to the aspects described above of the present invention, an analysis target can be easily extracted from entire circumference point cloud data acquired by a measuring device that is moving along a measurement route.

DESCRIPTION OF EMBODIMENT(S)

Hereinafter, a preferred embodiment of the present invention will be described with reference to the drawings, however, the present invention is not limited to this. In the following description of the embodiment, the same components are provided with the same reference sign, the same components are provided with the same name, and overlapping description is omitted as appropriate.

Configuration of Measuring Device

Figure 1A:
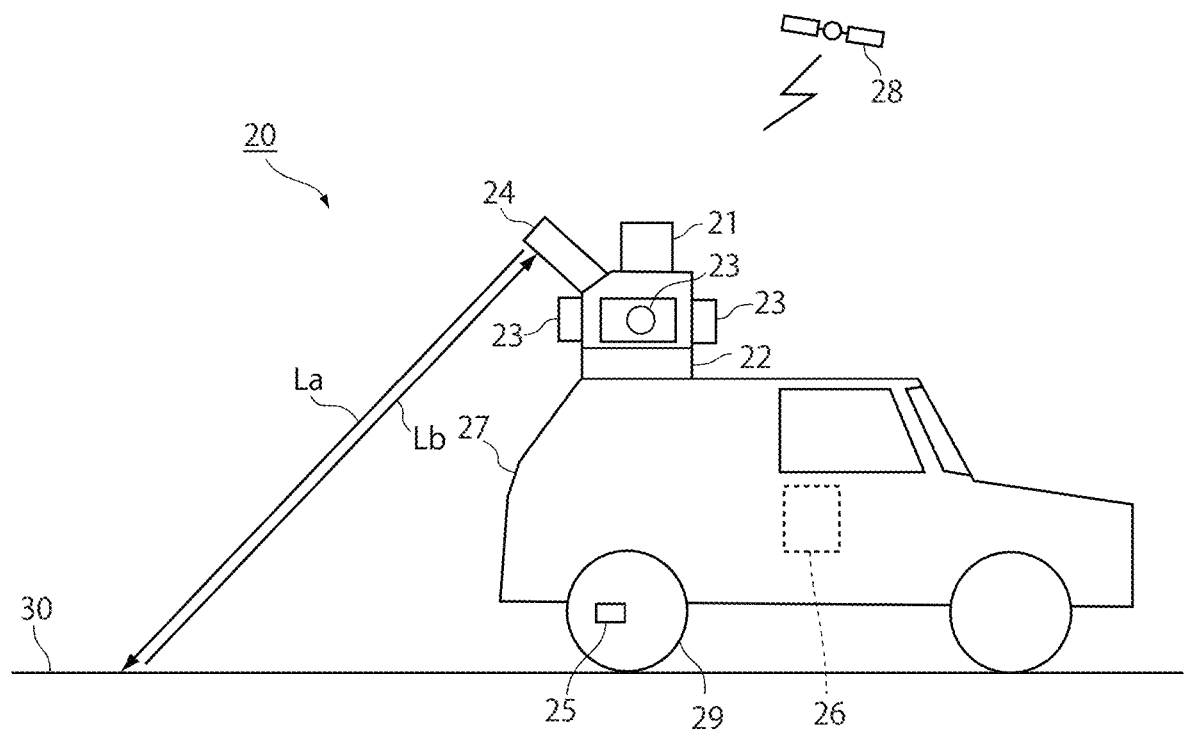
FIG. 1A is a view illustrating an outline of a measuring device that measures measurement data for a point cloud data processing method according to an embodiment of the present invention.

A point cloud data processing device according to the embodiment is a device to execute post-processing of measurement data acquired by, for example, a measuring device 20 illustrated in FIG. 1. First, the measuring device 20 will be described.

The measuring device 20 is a so-called MMS (Mobile Mapping System). The measuring device 20 includes a GNSS device 21, an IMU 22, a camera 23, a laser scanner 24, a rotary encoder 25, and a synchronization control device 26, installed in a vehicle 27.

The GNSS device 21 is a receiving device that receives a navigation signal from a navigation satellite 28 such as a GNSS satellite. Based on the navigation signal, the GNSS device 21 acquires satellite positioning data, that is, a plan position and an altitude of the measuring device 20. For example, the GNSS device 21 acquires coordinates of the measuring device 20 at intervals of ten times/second.

The IMU 22 is an inertial measuring device, includes a three axis gyroscope and a 3-directional accelerometer, and acquires inertial positioning data.

The camera 23 is a 360-degree camera consisting of a plurality of cameras, and shoots a video of the entire circumference ($2\pi$ space) including an upper direction. Although not described herein, video image data shot by the camera 23 is used for construction of three-dimensional information of the surroundings in combination with point cloud data measured by the laser scanner 24.

Exterior orientation elements (positions and postures) of the camera 23 and the laser scanner 24 with respect to the measuring device 20 (in this embodiment, a position of the IMU) are measured in advance, and such information is known.

Figure 1B:
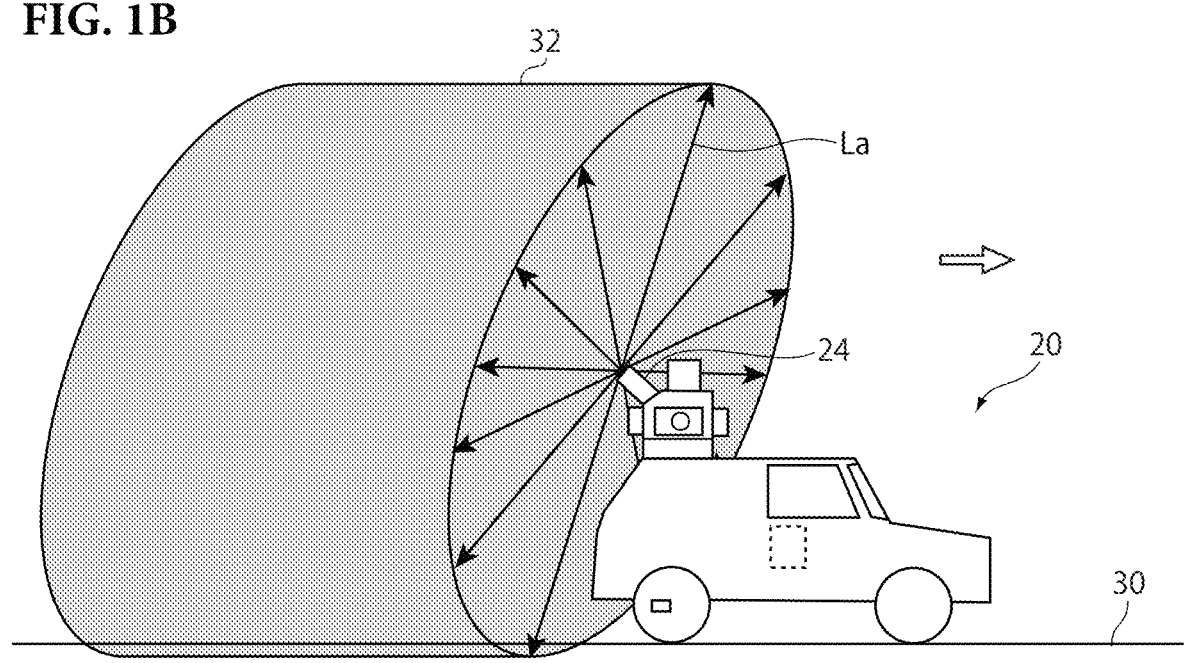
FIG. 1B is a view schematically illustrating a state of measurement by the measuring device.

As illustrated in FIG. 1B, the laser scanner 24 spirally irradiates a scanning light La onto the entire circumference ($2\pi$ space), and receives a reflected light Lb (FIG. 1B) from a structural object such as a road 30, a building, and a tree. Based on a time from emission of the scanning light La until reception of the reflected light Lb, the laser scanner 24 obtains a three-dimensional position of each reflection point, to acquire point cloud data over the entire circumference of the laser scanner 24.

Along with movement of the vehicle 27, the laser scanner 24 acquires measurement point cloud data as the entire circumference point cloud data of a scanning range 32 along a measurement route.

In the illustrated example, the laser scanner 24 is one in number. However, the number is not limited to this. The measuring device 20 may include a plurality of laser scanners 24 such as three or five. When the number of laser scanners 24 is increased, the point cloud density increases, and shadow portions can be minimized, so that a measurement with higher accuracy can be made.

The rotary encoder 25 is attached to a wheel 29 of the vehicle 27, and acquires vehicle moving distance data from a rotation speed and a rotation angle of the wheel 29.

The synchronization control device 26 is connected via cables, etc., or wirelessly to the GNSS device 21, the IMU 22, the camera 23, the laser scanner 24, and the rotary encoder 25.

The synchronization control device 26 synchronizes a time of inertial positioning data acquisition by the IMU 22, a time of image data acquisition by the camera 23, a time of point cloud data acquisition by the laser scanner 24, and a time of acquisition of moving distance data of the wheel 29 by the rotary encoder 25.

While moving along a measurement route, the measuring device 20 acquires satellite positioning data, inertial positioning data, measurement point cloud data, and moving distance data respectively by the GNSS device 21, the IMU 22, the camera 23, the laser scanner 24, and the rotary encoder 25. Hereinafter, these data are collectively referred to as "measurement data".

Embodiment

Hereinafter, a point cloud data generating method and a point cloud data processing device 100 according to an embodiment of the present invention will be described. The point cloud data processing device 100 generates three-dimensional point cloud data (resultant point cloud data) around a measurement route by using measurement data acquired by the measuring device 20.

The point cloud data processing device 100 is a so-called personal computer. The point cloud data processing device 100 includes hardware such as a CPU (Central Processing Unit) as a processor, a RAM (Random Access Memory) and a ROM (Read-Only Memory) as a main storage device, and a HDD (Hard Disk Drive) as an auxiliary storage device, and a liquid crystal display as a display device, etc.

The point cloud data processing device 100 is configured to be connectable to the GNSS device 21, the IMU 22, the camera 23, the laser scanner 24, and the rotary encoder 25 via the synchronization control device 26. The point cloud data processing device 100 may be located outside the vehicle or may be located inside the vehicle. In the present description, for the sake of convenience, the point cloud data processing device is assumed to be located outside the vehicle.

Figure 2:
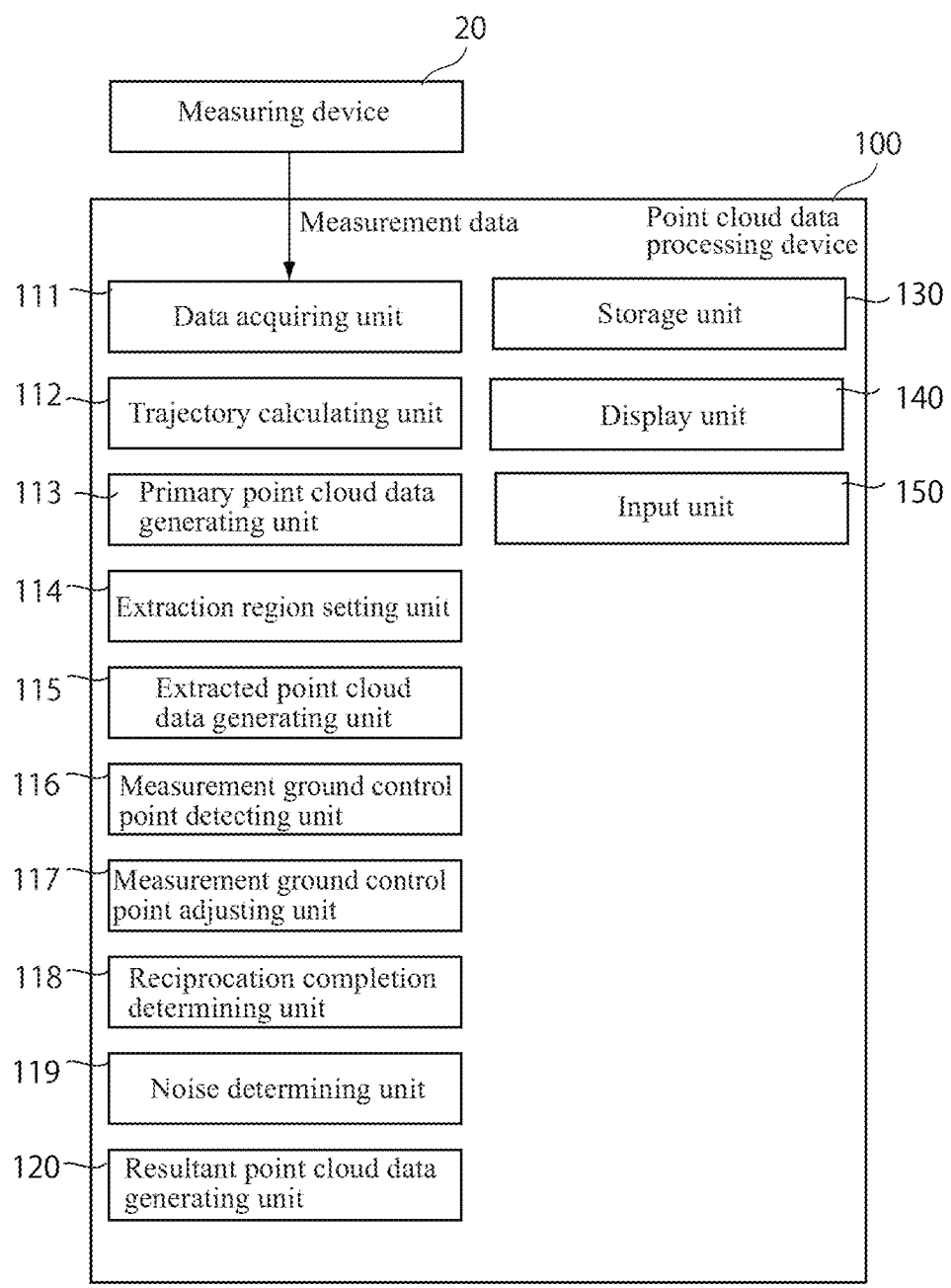
FIG. 2 is a functional block diagram of a point cloud data processing device that executes the point cloud data processing method according to the embodiment of the present invention.

FIG. 2 is a functional block diagram of the point cloud data processing device 100. The point cloud data processing device 100 includes: various function units including a data acquiring unit 111, a trajectory calculating unit 112, a primary point cloud data generating unit 113, an extraction region setting unit 114, an extracted point cloud data generating unit 115, a measurement ground control point detecting unit 116, a measurement ground control point adjusting unit 117, a reciprocation completion determining unit 118, a noise determining unit 119, and a resultant point cloud data generating unit 120; a storage unit 130; a display unit 140; and an input unit 150.

The respective function units implement respective functions by executing programs by the CPU. The programs to implement the functions of the respective function units may be stored in a storage medium such as a magnetic disc, a flexible disc, an optical disc, a compact disc, a Blu-ray (registered trademark) disc, a DVD, or the like.

The data acquiring unit 111 accepts measurement data via an input interface (not illustrated) and stores the measurement data in the storage unit 130.

The input interface is a port to be connected to the synchronization control device 26. The input interface is, for example, a USB (Universal Serial Bus) terminal. Alternatively, the input interface may be a port to be connected to a LAN (Local Area Network).

The trajectory calculating unit 112 receives satellite positioning data and inertial positioning data from the storage unit 130, and calculates a trajectory of the measuring device 20 in a plane rectangular coordinate system by processing using a Kalman filter.

As described above, a positional relationship between the laser scanner 24 and the measuring device 20 (IMU device) is known, and associated with each other. That is, in the present description, "trajectory of the measuring device 20" is associated with "trajectory of the center of the laser scanner 24."

The primary point cloud data generating unit 113 generates primary point cloud data in a plane rectangular coordinate system by using the measurement point cloud data and the calculated trajectory point data.

Based on respective trajectory points acquired by the trajectory calculating unit 112, the extraction region setting unit 114 sets an extraction angle range and an extraction distance range to set an extraction region.

The extracted point cloud data generating unit 115 generates extracted point cloud data by extracting point cloud data disposed in the region set by the extraction region setting unit 114 from the primary point cloud data. And, outputs the extracted point cloud data to the display unit 140, and stores the extracted point cloud data in the storage unit 130.

The measurement ground control point detecting unit 116 detects measurement ground control points 41 from the extracted point cloud data displayed on the display unit 140.

The measurement ground control point adjusting unit 117 re-calculates a trajectory based on the measurement ground control points 41 detected by the measurement ground control point detecting unit 116 and known ground control point coordinates. Then, based on the re-calculated trajectory and the extracted point cloud data, the measurement ground control point adjusting unit 117 generates adjusting point cloud data.

The reciprocation completion determining unit 118 determines whether the generation of adjusted point cloud data has been completed for both of a forward route and a return route of the measurement route.

The noise determination unit 119 compares adjusted point cloud data for the forward route and the return route of the measurement route, and determines data included in only one route of the forward and return route as noise.

The resultant point cloud data generating unit 120 deletes data determined as noise by the noise determining unit 119, generates resultant point cloud data by synthesizing point cloud data for the forward route and the return route, displays the data on the display unit 140, and stores the data in the storage unit 130.

The storage unit 130 stores measurement data, data calculated in the respective function units, and various programs and settings for making the data processing device 100 implement the functions. The storage unit 130 is realized by a main storage device and an auxiliary storage device, however, may be realized only by a main storage device or only by an auxiliary storage device.

The display unit 140 displays extracted point cloud data and resultant point cloud data, etc. The display unit 140 is realized by a display device.

The input unit 150 is a user interface for inputting various commands for, for example, the start of processing from a user. An example of the input unit 150 may include a keyboard, a mouse, etc.

Point Cloud Data Processing Method

Next, a point cloud data processing method according to the present embodiment is described.

Figure 3:
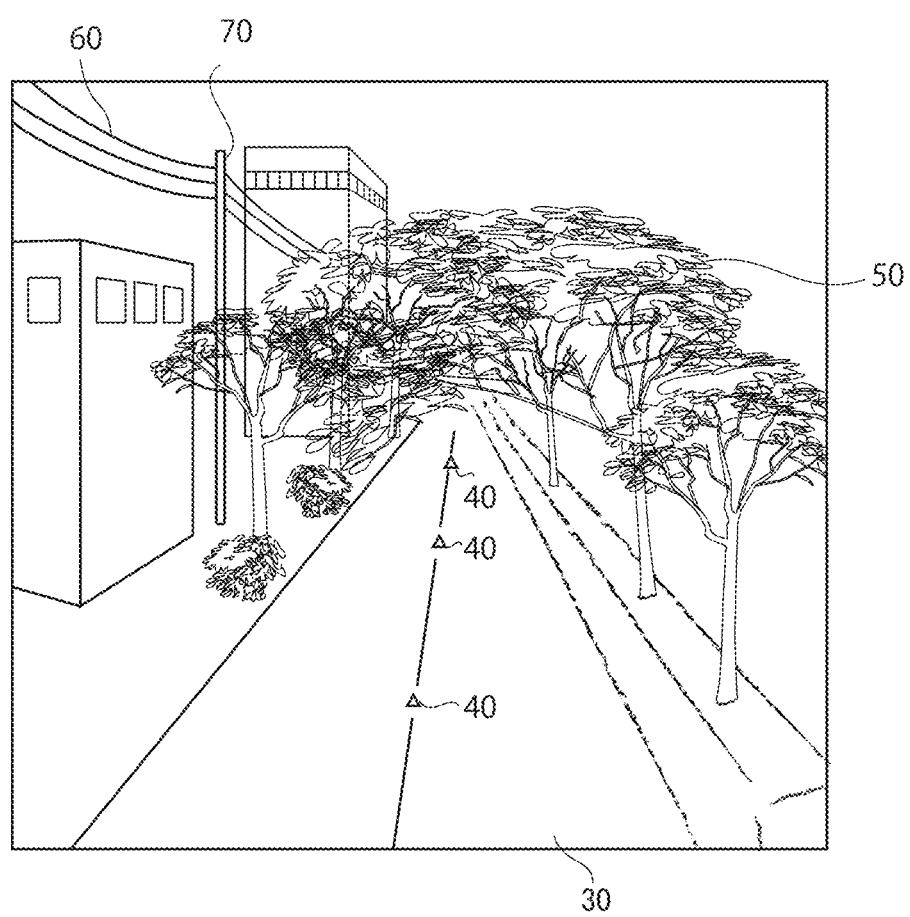
FIG. 3 is a view illustrating an example of a measurement route to be measured by the measuring device.

As a detailed example, measurement data acquired by the measuring device 20 through reciprocation on a predetermined measurement route is used, and description is given on the assumption that an analysis target is ground control points 40 set at predetermined intervals on a road 30 on the measurement route as illustrated in FIG. 3. Each ground control point 40 is provided with a reflection sheets, and the like. The ground control points 40 are measured by a total station and their coordinates are made known in advance.

Figure 4:
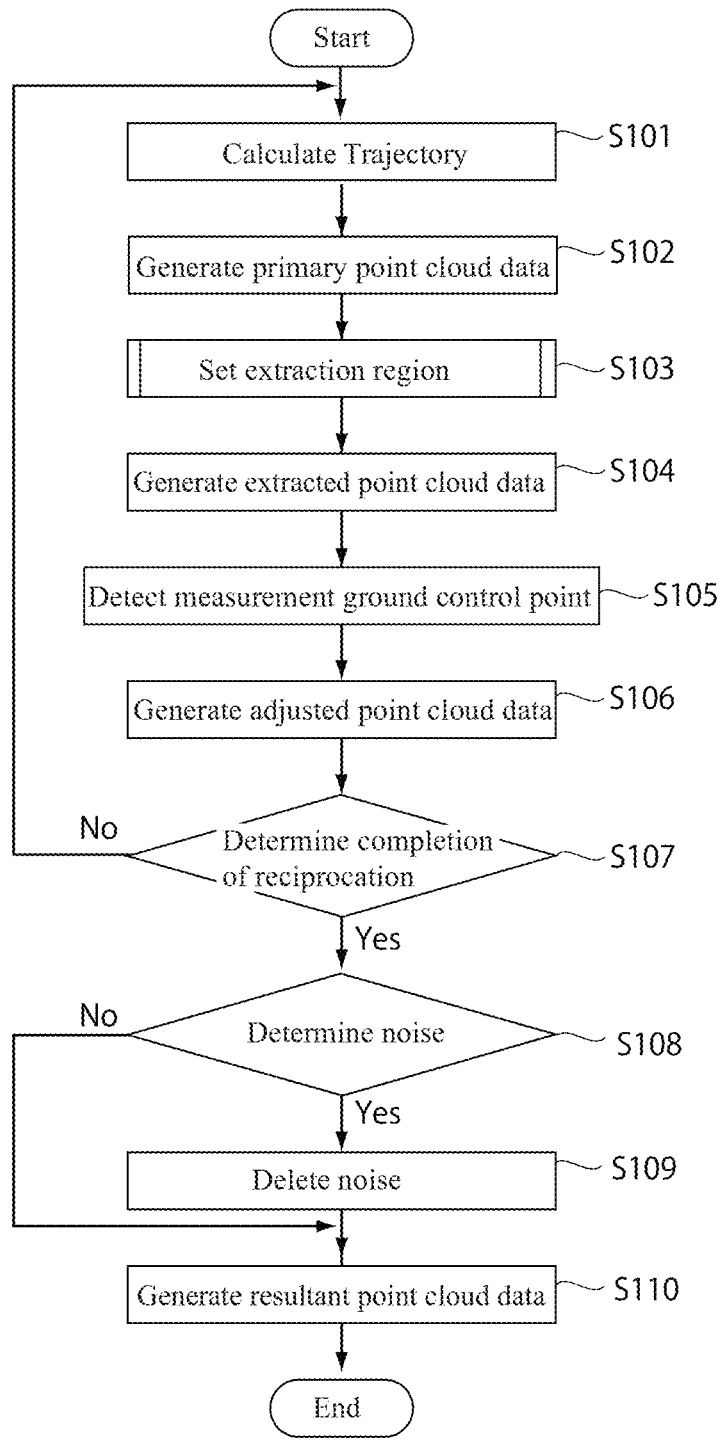
FIG. 4 is a flowchart of point cloud data generation processing in the point cloud data processing method according to the same embodiment.

FIG. 4 is a flowchart of the point cloud data processing method. When the processing is started, in Step S101, the trajectory calculating unit 112 receives satellite positioning data and inertial positioning data for one route from the storage unit 130, and by processing using a Kalman filter, calculates a trajectory in a plane rectangular coordinate system.

Next, in Step S102, the primary point cloud data generating unit 113 converts measurement point cloud data relating to the same route into plane rectangular coordinate system data by use of the trajectory calculated in Step S101 to generate primary point cloud data of the entire circumference.

Next, in Step S103, the extraction region setting unit 114 sets an extraction angle range and an extraction distance range to set an extraction region. Details of setting of the extraction angle range and setting of the extraction distance range will be described later.

Next, in Step S104, the extracted point cloud data generating unit 115 extracts point cloud data in the region determined by the extraction region setting unit 114 from the primary point cloud data, to generate extracted point cloud data. And, the extracted point cloud data generating unit 115 displays the extracted point cloud data on the display unit 140, and stores the extracted point cloud data in the storage unit 130.

Next, in Step S105, the measurement ground control point detecting unit 116 detects points or regions with high reflection intensity from the extracted point cloud data displayed on the display unit 140, and designates the points or regions as ground control points 40. On the ground control points 40 set on the road, reflection sheets or the like are provided, so that the measurement ground control points 41 in the point cloud data appear as points or regions with high reflection intensities.

Detection and designation of ground control points may be realized by a configuration made such that a user can recognize portions having high reflection intensities and specific shapes as ground control points in the extracted point cloud data displayed on the display unit and can select the points in order with a mouse pointer, etc. Alternatively, another configuration is also possible in which ground control points can be automatically extracted from point cloud data based on reflection intensities and shapes.

Next, in Step S106, the measurement ground control point adjusting unit 117 re-calculates a trajectory based on the detected measurement ground control points and known ground control point coordinates. Based on the re-calculated trajectory, the measurement ground control point adjusting unit 117 generates adjusted point cloud data.

Next, in Step S107, the reciprocation completion determining unit 118 determines whether the generation of adjusted point cloud data has been completed for both of the forward route and the return route of the measurement route.

When the generation has been completed only for one route (for example, the forward route) (No), the processing returns to Step S101, and the processing in Steps S101 to S107 is repeated for the other route (for example, the return route).

On the other hand, in Step S107, when the generation is completed for both routes (Yes), in Step S108, the noise determining unit 119 compares the adjusted point cloud data for forward route and the return route to determine whether there is data included only in one route.

In Step S108, when there is data included only in one route (Yes), the noise determining unit 119 determines the data included only in one route as noise, and in Step S109, deletes this noise point cloud data. Then, the processing shifts to Step S110.

On the other hand, in Step S108, when there is no data included only in one route (No), the noise determining unit 119 determines the adjusted point cloud data in question as data without noise, and the processing shifts to Step S110.

Then, in Step S110, the resultant point cloud data generating unit 120 synthesizes adjusted point cloud data from which noise was deleted in S109 or adjusted point cloud data determined as data without noise in Step S108 for the forward route and the return route to generate resultant point cloud data. The resultant point cloud data is then output to the display unit 140 and stored in the storage unit 130, and the processing is ended.

Figure 5:
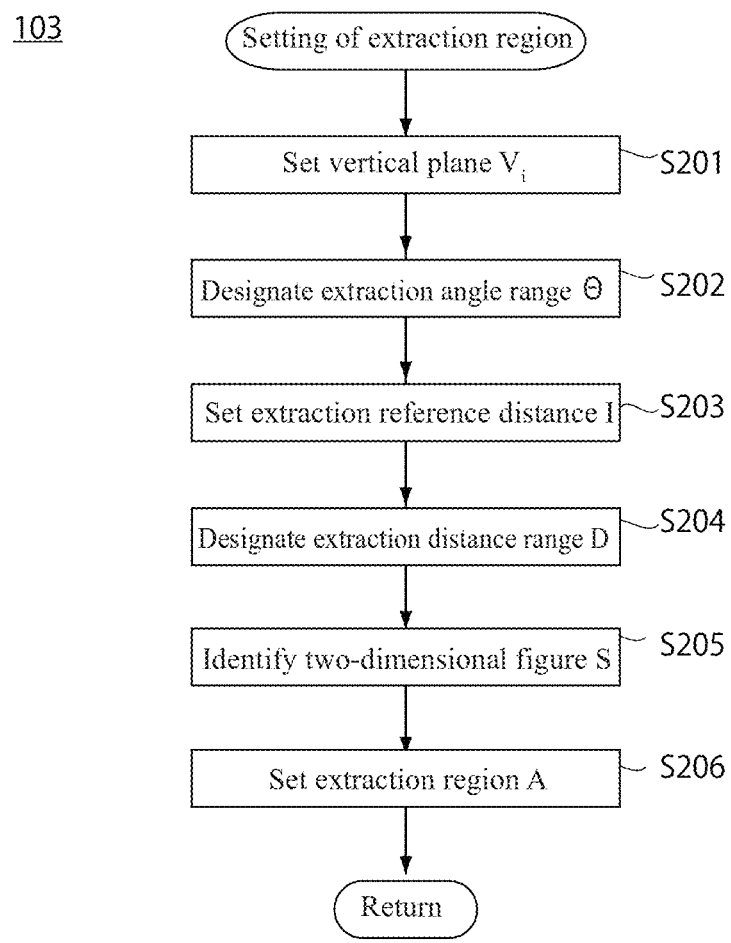
FIG. 5 is a flowchart of extraction region setting processing in the same point cloud data processing method.

Next, the setting of an extraction region in Step S103 is described with reference to FIGS. 5 to 7. FIG. 5 is a detailed flowchart of Step S103.

Figure 6A:
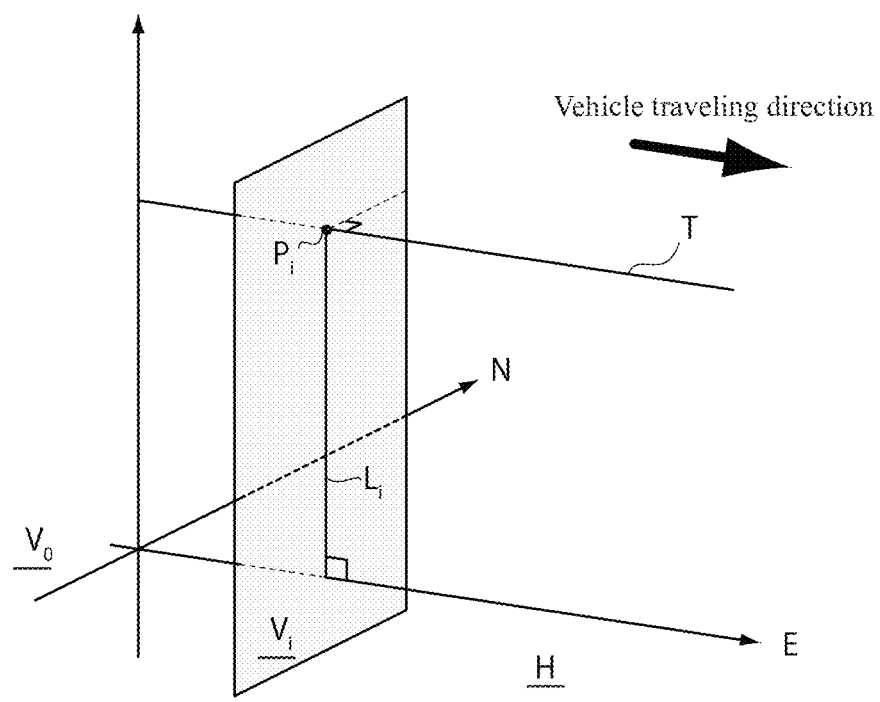
FIGS. 6A and 6B are diagrams describing an extraction region setting method in the same point cloud data processing method.

When the setting of an extraction region is started, in Step S201, the extraction region setting unit 114 sets an arbitrary vertical plane $V_i$ orthogonal to the trajectory T of the measuring device 20 as illustrated in FIG. 6A. FIG. 6A illustrates the trajectory calculated in Step S101 represented in a plane rectangular coordinate system. For the sake of convenience, the measuring device 20 is assumed to have moved eastward on the E axis.

Figure 6B:
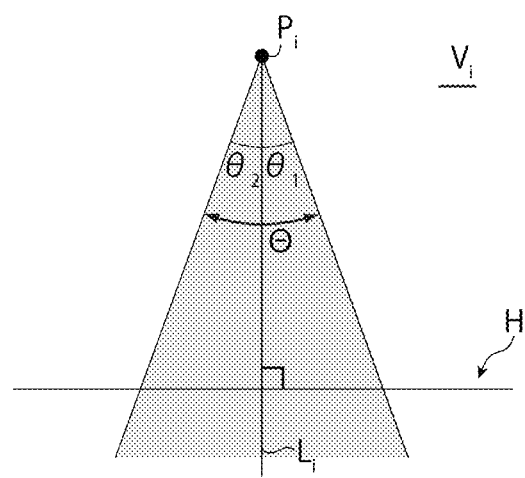

Next, as illustrated in FIG. 6B, in Step S202, on the vertical plane $V_i$, based on a perpendicular $L_i$ drawn down to the horizontal plane H from an intersection $P_i$ of the trajectory T and the vertical plane $V_i$, the extraction region setting unit 114 designates an extraction angle range Θ as $-\theta_1 \leq \Theta \leq +\theta_2$ around the intersection $P_i$. FIG. 6B is a diagram of an arbitrary vertical plane $V_i$ orthogonal to the trajectory T as viewed in the moving direction of the measuring device 20.

Values of the extraction angular widths $\theta_1$ and $\theta_2$ are set in advance. Generally, the ground control points 40 are set at the center of the road as illustrated in FIG. 3 or at predetermined positions such as positions on the road shoulder. Therefore, the values of the extraction angular widths $\theta_1$ and $\theta_2$ can be predicted to some extent from, for example, a relationship between the height of the intersection P from the road and a road width or set position. Based on this prediction, for example, setting is made such that, when the ground control points are set at the center of a one-lane road, $\theta_1 = \theta_2 = 40°$, and when the ground control points are set, for example, on the center line of a two-lane road, $\theta_1 = 60°$ and $\theta_2 = 40°$.

Figure 7A:
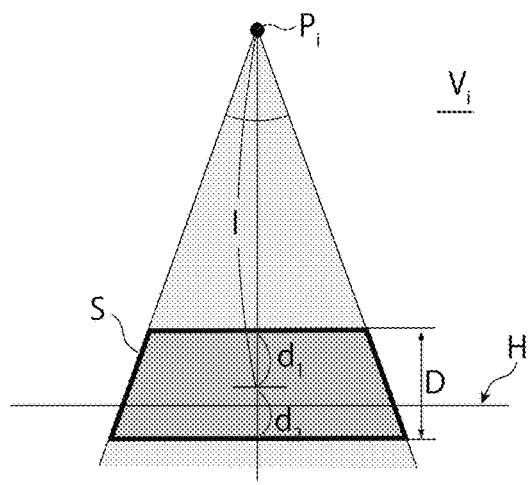
FIGS. 7A, 7B, and 7C are diagrams describing an extraction region setting method in the same point cloud data processing method.

Next, in Step S203, the extraction region setting unit 114 sets an extraction reference distance l. The extraction reference distance l is set as a distance in the vertical direction from the intersection $P_i$ of the trajectory T and an arbitrary vertical plane $V_i$ on the vertical plane $V_i$ as illustrated in FIG. 7A.

A value of the extraction reference distance l may be set in advance. For example, the distance from a road surface to the trajectory T is estimated to be substantially equal to a height h of the measuring device 20. The height h of the measuring device 20 from the road surface is known.

Figure 7B:
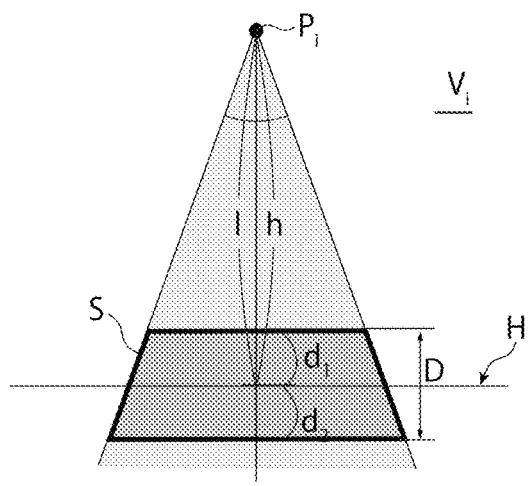

Therefore, as illustrated in FIG. 7B, the height h of the measuring device 20 can be set as the extraction reference distance 1.

In a measurement using the measuring device 20, a structural object measured in the vertically downward direction is mainly the road 30, so that setting the height h of the measuring device 20 as the extraction reference distance 1 enables easy and proper setting of the extraction reference distance 1.

Next, in Step S204, by using extraction widths $d_1$ and $d_2$ determined in advance, an extraction distance range D is designated as $1-d_1 \leq D \leq 1+d_2$ from an intersection $P_x$ with the trajectory.

The extraction distance widths $d_1$ and $d_2$ can be set such that $d_1$, $d_2=30$ cm when it is desired to extract, for example, points around a road as in this e. The extraction distance widths $d_1$ and $d_2$ may be equal to each other, or different from each other.

Next, in Step S205, as illustrated in FIG. 7A, the extraction region setting unit 114 identifies a trapezoid two-dimensional figure S on the vertical plane $V_i$ by using the designated extraction angle range Θ and extraction distance range D.

Figure 7C:
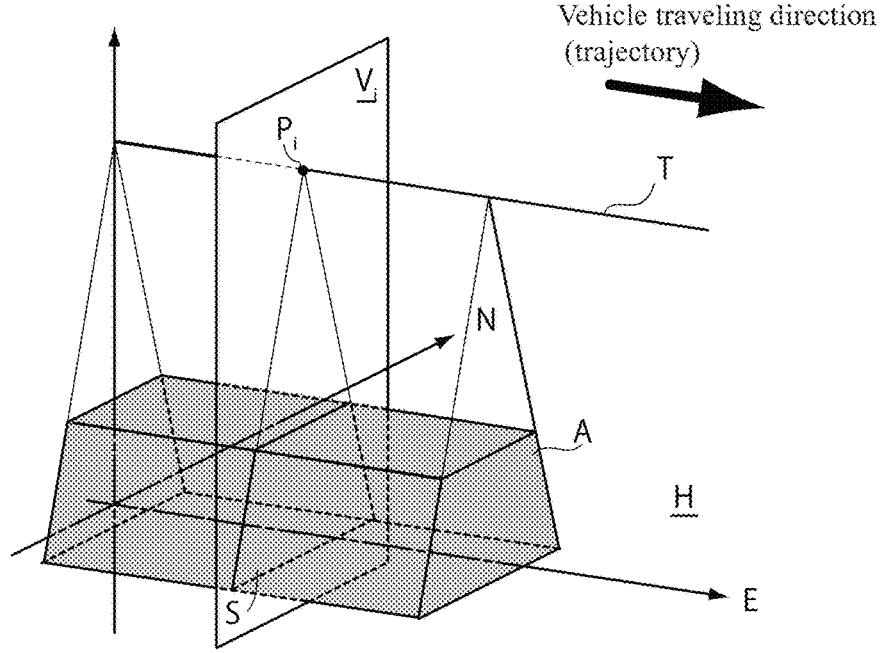

Next, in Step S206, as illustrated in FIG. 7C, the extraction region setting unit 114 sets a region obtained by extending the two-dimensional figure S along the trajectory, as an extraction region A, and the processing shifts to Step S104.

Figure 8B:
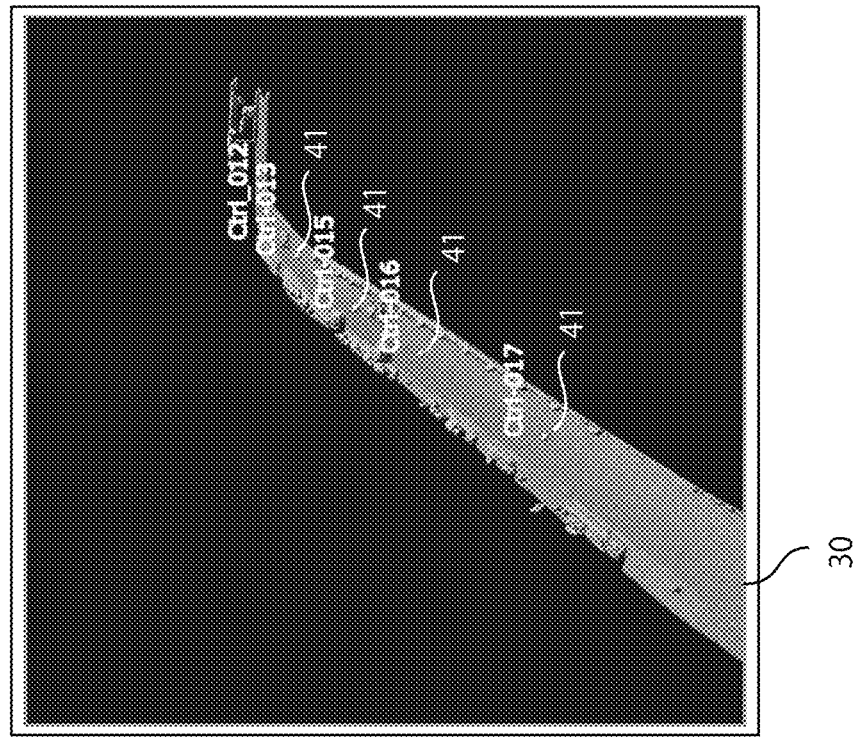
FIG. 8B illustrates extracted point cloud data after extraction processing by the same method.
Figure 8A:
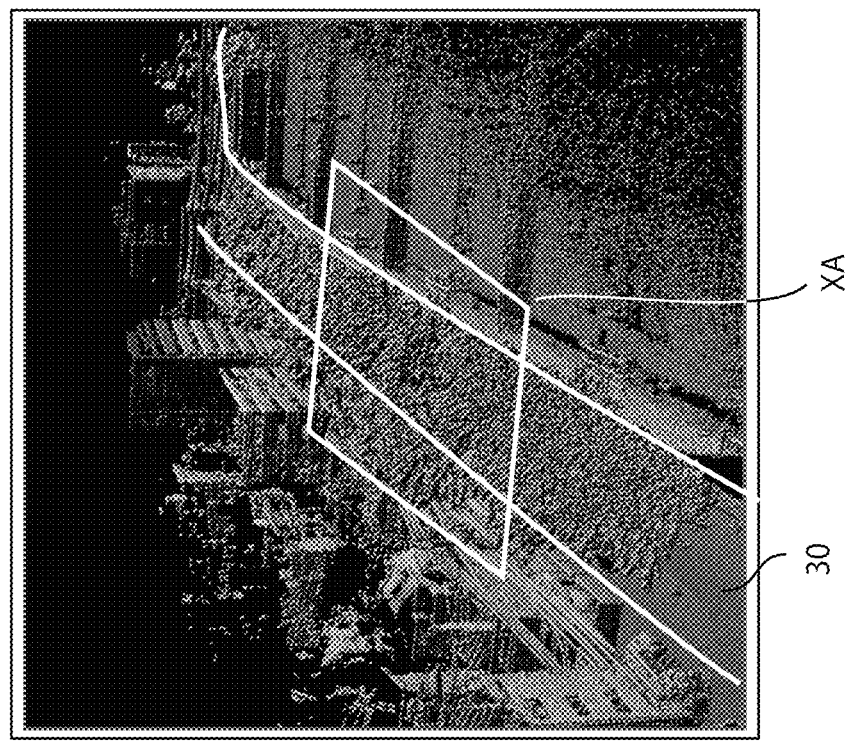
FIG. 8A illustrates entire circumference point cloud data before extraction processing by the same point cloud data processing method.
Figure 9B:
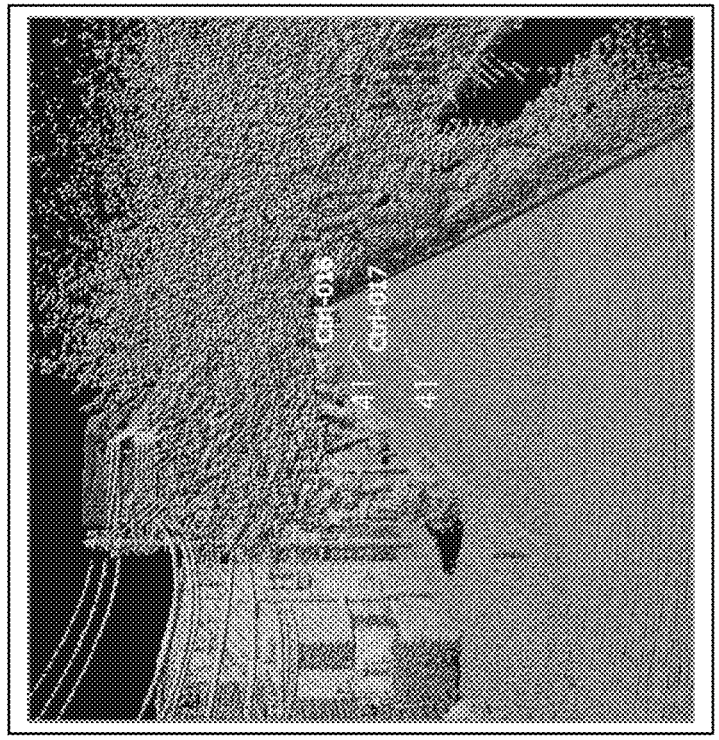
FIGS. 9A and 9B are views of the point cloud data in FIG. 8A as viewed from different directions.
Figure 9A:
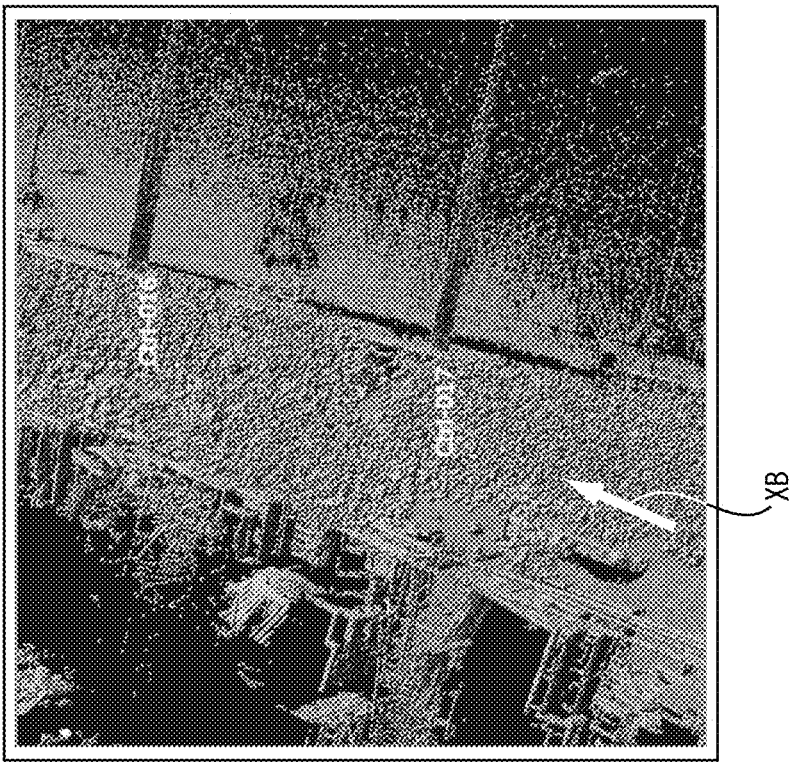

An example of extracted point cloud data extracted in this way is illustrated in FIGS. 8A and 8B. FIG. 8A illustrates primary point cloud data before extraction processing, and FIG. 8B is a bird's-eye view of the same route, illustrating point cloud data after extraction processing. FIG. 9A is a plan view enlarging the white-line quadrangular portion illustrated in FIG. 8A of the same primary point cloud data as in FIG. 8A, and FIG. 9B is a view in the arrow direction in FIG. 9A as viewed from a point of view on the road.

As illustrated in FIG. 8A, in the primary point cloud data before the extraction processing, the road 30 is covered by point cloud data based on the tree 50 and other structural objects. Therefore, it is difficult to visually identify the measurement ground control points 41 from the displayed point cloud data. By changing the display direction as in FIG. 9B, the measurement ground control points 41 can be detected. However, magnification and a change in display region need to be repeated for detection, so that the detection operation becomes troublesome.

On the other hand, as illustrated in FIG. 8B, after the extraction processing, the road 30 and the measurement ground control points 41 can be easily detected.

In this way, by the point cloud data generating method according to the present embodiment, point cloud data on an analysis target can be easily extracted from point cloud data acquired over the entire circumference of the measuring device for a measurement route.

When structural objects such as trees and buildings are present over the traveling route of the measuring device 20, it is difficult to detect ground control points from primary point cloud data, as in FIG. 8A. Such situation means that the area over the measuring device 20 is shielded at the time of measurement. In this case, a reception condition of the GNSS device 21 deteriorates, and a trajectory error easily becomes large.

Therefore, in order to acquire highly accurate three-dimensional point cloud data, it is important to adjust the trajectory and the point cloud data with the measurement ground control points 41. In this way, easy detection of ground control points by setting the analysis target as the ground control points and extracting point cloud data makes easier adjustments of trajectory and point cloud data, and this is particularly advantageous.

On the other hand, the point cloud data processing device 100 may be configured as a point cloud data extracting device that does not include the measurement ground control point detecting unit 116, the measurement ground control point adjusting unit 117, the reciprocation completion determining unit 118, the noise determining unit 119, and the resultant point cloud data generating unit 120, and executes only the processing of Steps S101 to S104.

In this case, as primary point cloud data, entire circumference point cloud data in various stages such as point cloud data adjusted by using a trajectory that has already been adjusted, can be used.

In this embodiment, a description is given by assuming an analysis target as ground control points 40 set on the road 30. However, in this method, not only the ground control points 40 but also a road surface shape of the road 30 or a structural object installed near the road surface, etc. can be used as an analysis target.

Modification 1

Figure 10A:
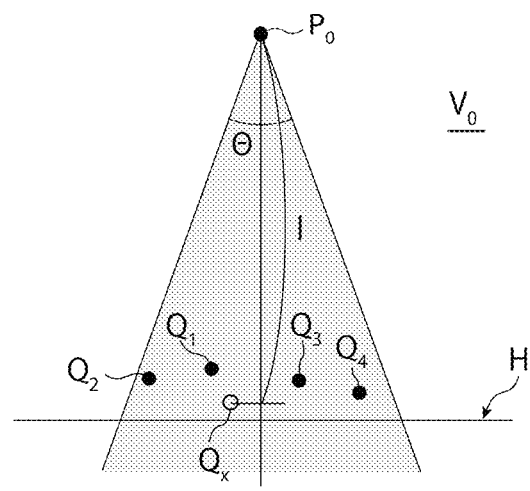
FIGS. 10A and 10B are diagrams illustrating a modification of the extraction region setting processing in the same point cloud data processing method.

The setting of the extraction reference distance 1 in Step S203 may be not only setting in advance but also be automatic setting as follows. As an example, as illustrated in FIG. 10A, in point data included in the extraction angle range Θ, a furthest point $Q_x$ from the trajectory T is identified, and a distance between the point $Q_x$ and the trajectory T may be set as the extraction reference distance 1. FIG. 10A is a view in the traveling direction from a vertical plane $V_0$ at the starting point $P_0$ of the trajectory T.

In this case, simply, the shortest distances from the respective points $Q_1$, $Q_2$, $Q_3$, . . . to the trajectory T are calculated and compared with each other, and a point having the longest distance is identified as the furthest point $Q_x$. Then, a shortest distance between the point $Q_x$ and the trajectory T is set as the extraction reference distance 1.

In a measurement using the measuring device 20, a structural object measured in the vertically downward direction is mainly the road 30, and there is a high possibility that the furthest point $Q_x$ is present on a road surface of the road 30 or in the surroundings of the road surface. Therefore, by designating a range with predetermined extraction distance widths $d_1$ and $d_2$ upward and downward from the point $Q_x$ set as a reference as the extraction distance range D, an extraction region for accurate extraction of point cloud data based on structural objects around the road surface of the road 30 can be set.

Alternatively, as the furthest point $Q_x$, a lowest point may be identified, simply. This is because the lowest point is considered to be present near the furthest point $Q_x$, and when considering a measurement of the road surface, the road surface is highly likely to include the lowest point. In FIG. 10A, the furthest point $Q_x$ matches the lowest point. In this way, even by designating a range with predetermined extraction distance widths $d_1$ and $d_2$ upward and downward from the lowest point set as a reference, an extraction region for accurate extraction of point cloud data based on structural objects around the road surface of the road 30 can be set.

Modification 2

Alternatively, as another example, the extraction reference distance 1 may be set as follows.

Figure 11A:
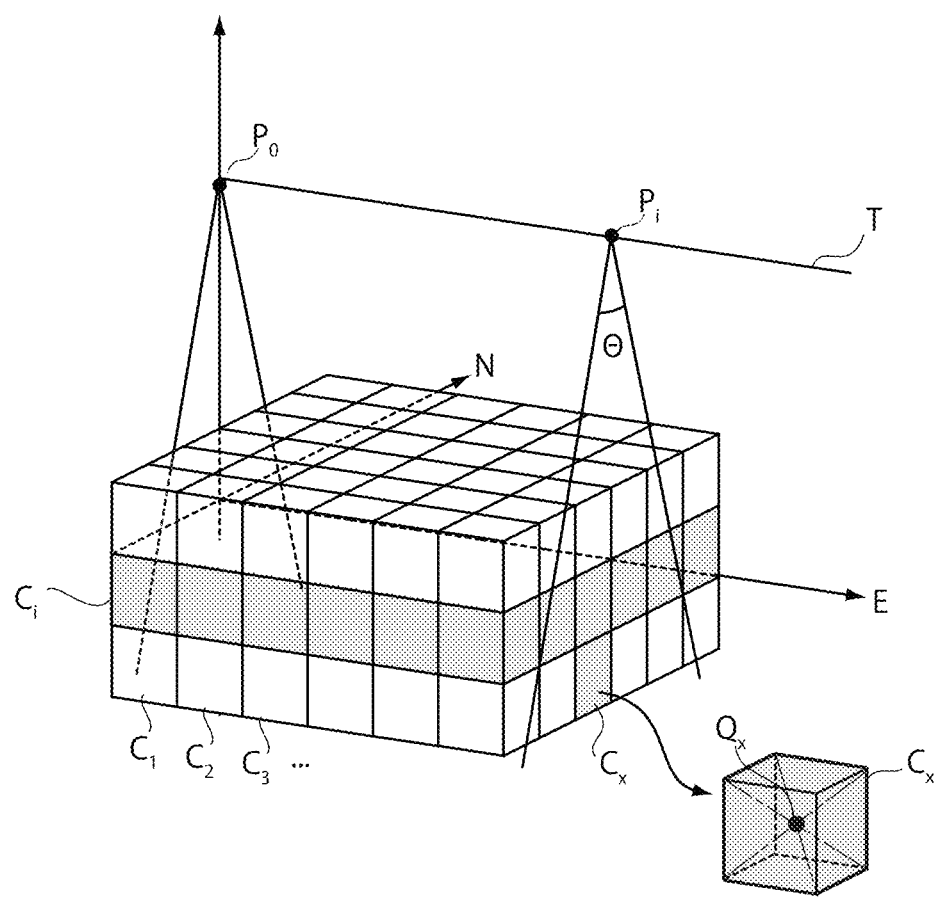
FIGS. 11A and 11B are diagrams illustrating another modification of the extraction region setting processing in the same point cloud data processing method.

First, as illustrated in FIG. 11A, in the extraction angle range Θ in the plane rectangular coordinate system, cubes $C_1, C_2, \ldots$ with predetermined dimensions are stacked, and cubes each including points whose density is not less than a predetermined value are extracted. In FIG. 11A, shaded portions are cubes including points at densities not less than the predetermined value.

Next, the extraction region setting unit 114 identifies a cube $C_x$ whose shortest distance from the trajectory T is the longest among the cubes including points at densities not less than the predetermined value. A center of this cube is identified as a furthest point $Q_x$ from the trajectory T.

Figure 11B:
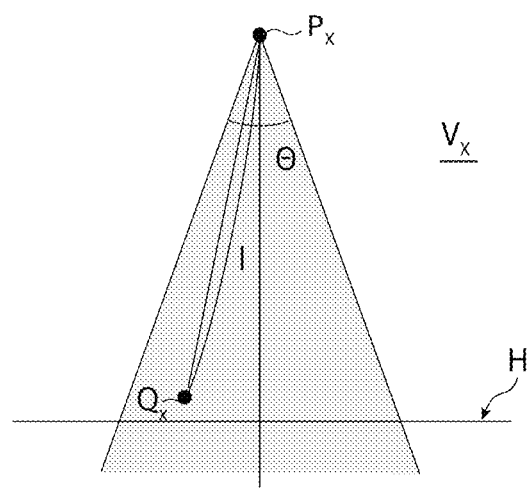

Next, the shortest distance between the point $Q_x$ and the trajectory T, that is, a distance between the point $Q_x$ and the intersection $P_x$ on the vertical plane $V_x$ passing through the point $Q_x$ illustrated in FIG. 11B, is calculated as the extraction reference distance 1.

In this way, by identifying the furthest point $Q_x$ by comparing the distances of the cubes having predetermined dimensions and including point data at a predetermined density or more from the trajectory, the influences of noise such as dust on the point data can be eliminated, so that a more accurate extraction reference distance 1 can be set.

Modification 3

Figure 10B:
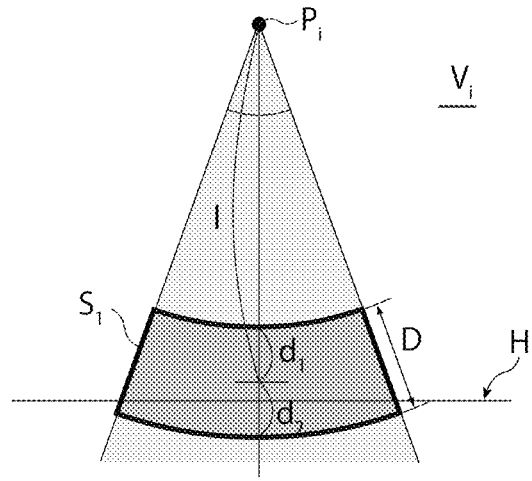

As a still another modification, the two-dimensional figure identified by the extraction angle range Θ and the extraction distance range D may be not a trapezoid as described above but an annular arc shape $S_1$ whose width is the extraction distance range D and whose central angle is the extraction angle range Θ as illustrated in FIG. 10B.

Modification 4

Figure 12:
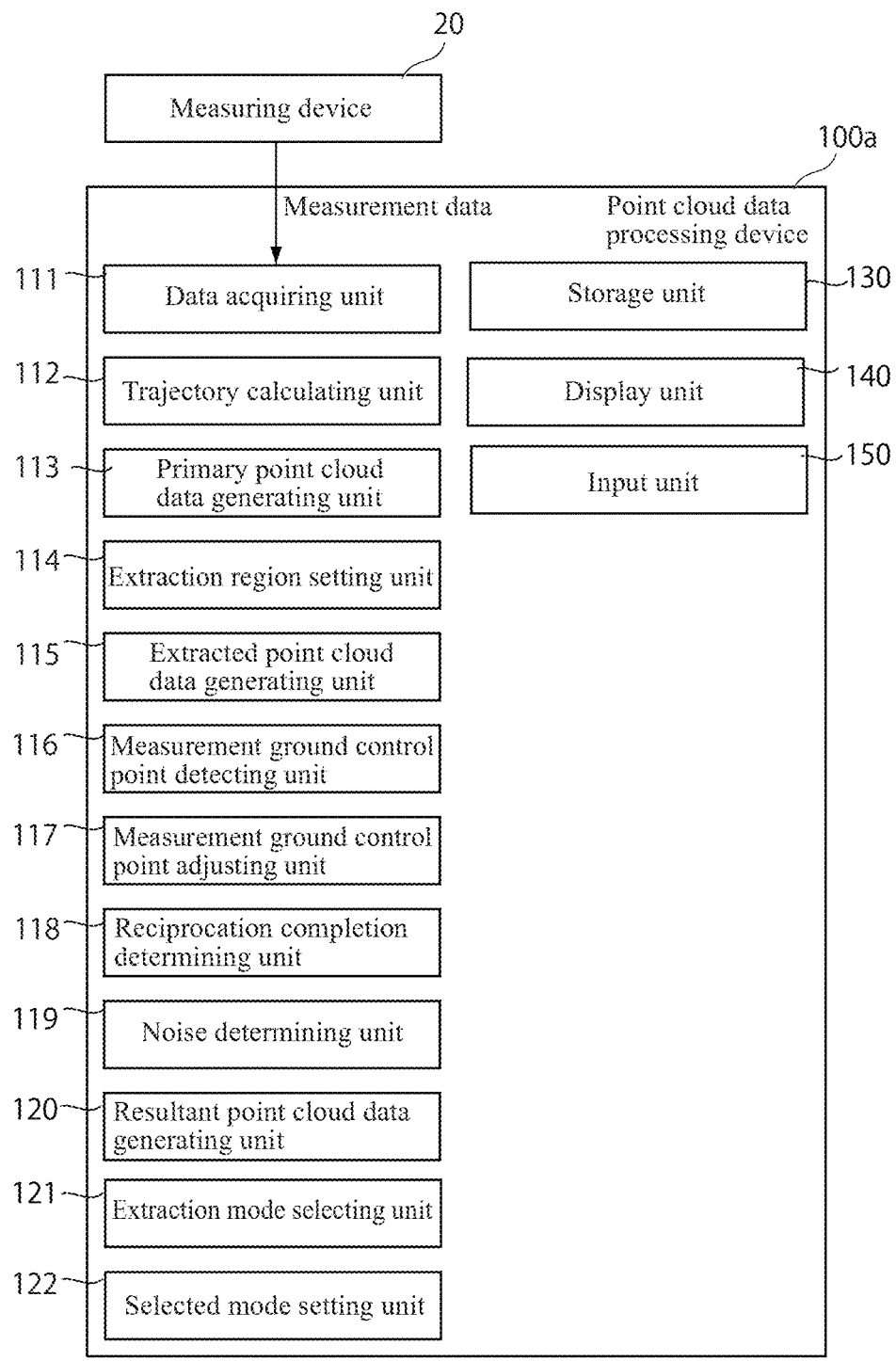
FIG. 12 is a functional block diagram of still another modification of the point cloud data processing device that executes the same point cloud data processing method.

As a yet another modification, the point cloud data processing device 100 according to the embodiment may be configured to be capable of switching an extraction mode according to a position of an analysis target, etc. FIG. 12 is a functional block diagram of a point cloud data processing device 100a according to this modification.

The point cloud data processing device 100a is a personal computer including the same hardware as in the point cloud data processing device 100. However, the point cloud data processing device 100a includes an extraction mode selecting unit 121 and a selected mode setting unit 122 in addition to the point cloud data processing device 100.

The extraction mode selecting unit 121 displays display for a user to select an extraction mode on the display unit 140. Selection of an extraction mode by a user by using the input unit 150 is enabled.

The selected mode setting unit 122 sets parameters (extraction angular widths $\theta_1$ and $\theta_2$, an extraction reference distance 1, and extraction distance widths $d_1$ and $d_2$) corresponding to a selected extraction mode.

Figure 13:
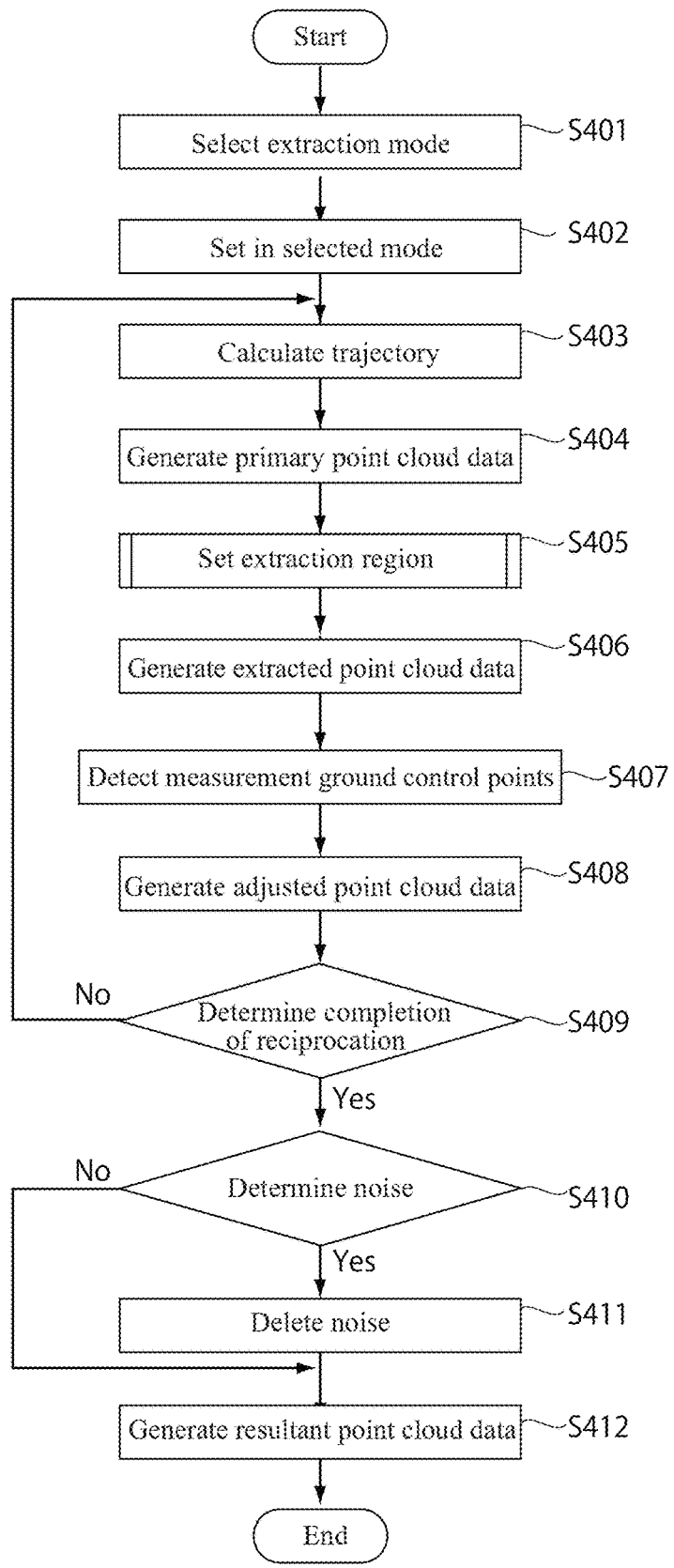
FIG. 13 is a flowchart of point cloud data processing by the point cloud data processing device.

FIG. 13 is a flowchart of point cloud data processing of the point cloud data processing device 200. When the processing is started, first, in Step S401, the extraction mode setting unit 121 displays a menu window 80 for selecting an extraction mode on the display unit 140 as illustrated in FIG. 14, and a user selects an extraction mode.

Figure 14:
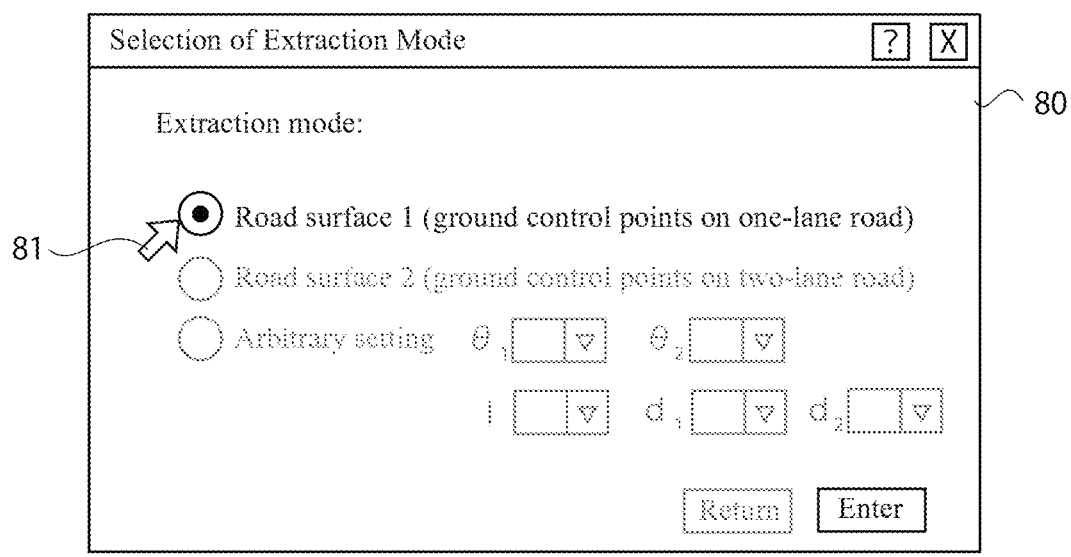
FIG. 14 is a view illustrating an extraction mode selection screen in the same point cloud data processing device.

In the example illustrated in FIG. 14, there are three modes for a road surface 1, a road surface 2, and arbitrary setting on the menu window 80. The road surface 1 mode corresponds to a case where the road is a one-lane road and ground control points are set at the center of the road. The road surface 2 mode corresponds to a case where the road is a two-lane road and ground control points are set on the center line. When a user selects arbitrary setting mode, the user can set the extraction angular widths $\theta_1$ and $\theta_2$, the extraction reference distance 1, and the extraction distance widths $d_1$ and $d_2$ by inputting arbitrary values. The configuration is made such that a user can select a mode by turning a radio button on with the mouse pointer 81. FIG. 14 illustrates a state where the mode for the road surface 1 is selected.

In the storage unit 130, the extraction angular widths $\theta_1$ and $\theta_2$, the extraction reference distance 1, and the extraction distance widths $d_1$ and $d_2$ corresponding to each extraction mode as illustrated in Table 1 are set in advance, and are stored in the form of, for example, a table, etc.

TABLE 1

Extraction mode setting table

| Extraction mode | $\theta_1(°)$ | $\theta_2(°)$ | l(cm) | $d_1$(cm) | $d_2$(cm) |
|---|---|---|---|---|---|
| Road surface 1 | −40 | 40 | 200 | 30 | 30 |
| Road surface 2 | −60 | 60 | 200 | 30 | 30 |
| Arbitrary setting | Input value | Input value | Input value | Input value | Input value |

When a user selects an extraction mode, the processing shifts to Step S402, and the selected mode setting unit 122 sets the extraction angular widths $\theta_1$ and $\theta_2$, the extraction reference distance 1, and the extraction distance widths $d_1$ an $d_2$ set for each extraction mode, respectively.

Next, the processing shifts to Step S403, and in subsequent Steps S403 to S412, the same processing as in Steps S101 to S110 is executed based on the values set in Step S402.

In this way, configuring a single data processing device to be capable of executing a plurality of extraction modes enables easy setting of proper extraction conditions according to positions, etc., of ground control points on a road.

Preferred embodiments of the present invention are described above, however, the above-described embodiment and modifications are just examples of the present invention, and can be combined based on knowledge of a person skilled in the art, and such a combined one is also included in the scope of the present invention.

REFERENCE SIGNS LIST

20 Measuring device
100, 100a Point cloud data processing device
114 Extraction region setting unit
121 Extraction mode selecting unit
122 Selected mode setting unit
T Trajectory
S Two-dimensional figure
A Extraction region

The invention claimed is:

1. A point cloud data processing method comprising the steps of:
(a) calculating a trajectory of an inertial measuring device in a plane rectangular coordinate system as a trajectory of a measuring device based on satellite positioning data and inertial positioning data acquired by the measuring device, the measuring device including a GNSS device for acquiring satellite positioning data, an inertial measuring device for acquiring inertial positioning data, and a laser scanner configured to scan the entire circumference to acquire three-dimensional point cloud data, the measuring device installed on a moving body moving along a measuring route;

(b) converting the three-dimensional point cloud data of the measuring route into primary point cloud data in the plane rectangular coordinate system;

(c) on a vertical plane orthogonal to the trajectory, designating predetermined extraction angular widths about an intersection of the trajectory and the vertical plane as a extraction angle range based on a perpendicular drawn down to a horizontal plane from the intersection, and a range of predetermined extraction distance widths based on the position of a predetermined extraction reference distance in the direction of the perpendicular from the intersection point as an extraction distance range, to identify an area defined by the extraction angle range and the extraction distance range as a two-dimensional figure, and setting a region obtained by extending the two-dimensional figure along the trajectory as an extraction region; and (d) extracting the primary point cloud data in the extraction region as extracted point cloud data.

2. The point cloud data processing method according to claim 1, wherein the two-dimensional figure is, on the vertical plane, a trapezoid defined by two lines extending in a radial direction about the interception point to define the extraction angle range and two lines extending in a direction parallel to the horizontal plane to define the extraction distance range on the vertical line.

3. The point cloud data processing method according to claim 1, wherein the two-dimensional figure is, on the vertical plane, an annular arc shape defined by two lines extending in a radial direction about the interception point to define the extraction angle range and two arcs extending in a circumferential direction around the interception point to define the extraction distance range on the perpendicular.

4. The point cloud data processing method according to claim 1, wherein the extraction reference distance is set as the shortest distance from the trajectory of the farthest point from the trajectory among the primary point cloud data in the extraction angle range.

5. The point cloud data processing method according to claim 1, further comprising the steps of:

(e) selecting one extraction mode from a plurality of extraction modes set in advance, each having the predetermined reference distance, the predetermined extraction distance widths and the extraction angular widths, the step (c) being executed with the predetermined extraction reference distance, the predetermined extraction widths, and the extraction angular widths in accordance with the selected one extraction mode.

6. The point cloud data processing method according to claim 4, wherein the extraction reference distance is set by sectioning the plane rectangular coordinate system so that cubes each having a predetermined size are continuous, extracting cubes each including point data whose density is not less than a predetermined value, identifying a cube whose shortest distance from the trajectory among the cubes including points at densities not less than the predetermined value, and identifying a center of a furthest cube as a point that is furthest from the trajectory.

7. A point cloud data processing device comprising:

a trajectory calculating unit configured to calculate a trajectory of an inertial measuring device in a plane rectangular coordinate system as a trajectory of a measuring device based on satellite positioning data and inertial positioning data acquired by the measuring device, the measuring device including a GNSS device for acquiring satellite positioning data, an inertial measuring device for acquiring inertial positioning data, and a laser scanner configured to scan the entire circumference to acquire three-dimensional point cloud data, the measuring device installed on a moving body moving along a measuring route;

a primary point cloud data generating unit configured to convert the three-dimensional point cloud data of the measuring route into primary point cloud data in the plane rectangular coordinate system;

an extraction region setting unit configured to, on a vertical plane orthogonal to the trajectory, designate predetermined extraction angular widths about an intersection of the trajectory and the vertical plane as a extraction angle range based on a perpendicular drawn down to a horizontal plane from the intersection, and a range of predetermined extraction distance widths based on the position of a predetermined extraction reference distance in the direction of the perpendicular from the intersection point as an extraction distance range, to identify an area defined by the extraction angle range and the extraction distance range as a two-dimensional figure, and set a region obtained by extending the two-dimensional figure along the trajectory as an extraction region, and an extracted point cloud data generating unit configured to extract the primary point cloud data in the extraction region as extracted point cloud data.

* * * * *